Oct. 13, 1970   M. J. HETHERINGTON   3,533,281
ROTARY ULTRASONIC PROBES

Filed Aug. 17, 1967   2 Sheets-Sheet 1

Inventor
MATTHEW J. HETHERINGTON

By Stevens, Davis, Miller & Mosher
Attorneys

Inventor
MATTHEW J. HETHERINGTON

By Stevens, Davis, Miller & Mosher
Attorneys

United States Patent Office 3,533,281
Patented Oct. 13, 1970

3,533,281
ROTARY ULTRASONIC PROBES
Matthew J. Hetherington, Carlton Park, near Market Harborough, England, assignor to Stewarts and Lloyds Limited, Glasgow, Scotland
Filed Aug. 17, 1967, Ser. No. 661,432
Claims priority, application Great Britain, Aug. 24, 1966, 38,061/66
Int. Cl. G01n 29/04
U.S. Cl. 73—71.5                                7 Claims

ABSTRACT OF THE DISCLOSURE

A rotary ultrasonic probe has a rotor with an annular recess into which liquid is supplied, the annular recess being aligned with a pair of stationary sleeves forming a guideway for a workpiece under test so that the flow of liquid from the recess is restricted by the gap between the sleeves and the workpiece, piezoelectric elements being provided in the recess for generating ultrasonic waves for testing the workpiece as it moves through the recess.

---

This invention is concerned with rotary ultrasonic probes of the kind employing liquid for coupling an ultrasonic generator to an article to be tested, the liquid providing a path for ultrasound between the generator and the article.

It is an object of the invention to provide a probe of the kind referred to which can be used with the generator rotating at a high speed relative to the surface of a longitudinally moving article of circular cross-section, e.g. a steel tube.

According to the invention, a probe of the kind referred to comprises a guideway of circular cross-section extending in opposite directions from at least one recess which contains an ultrasonic transducer and is provided with means for supplying liquid into the recess, which recess is of substantially smaller axial length than the guideway.

In use, liquid leaks from the recess between the circular guideway and the surface of an article being tested, while the article moves longitudinally through the guideway, and the liquid acts in effect as a lubricant, while, owing to the restriction of the rate of leakage of the liquid between the guideway and the article and to the centrifugal force, the recess is kept full of liquid.

The axial length of the recess is preferably kept to a minimum (i.e., not substantially longer than is necessary to allow for fitting the generator or generators). The depth (i.e., radial dimension) of the recess is also preferably kept to a minimum. The axial length of the guideway is preferably a plurality of times its diameter.

Preferably, said recess is of annular form. The annular recess may contain a plurality of ultrasonic generators spaced therearound.

Preferably, the guideway is provided in a stator while said recess is provided in a rotor.

The following is a description, by way of example, of an embodiment of the invention, reference being made to the accompanying drawings, in which.

Figure 1:
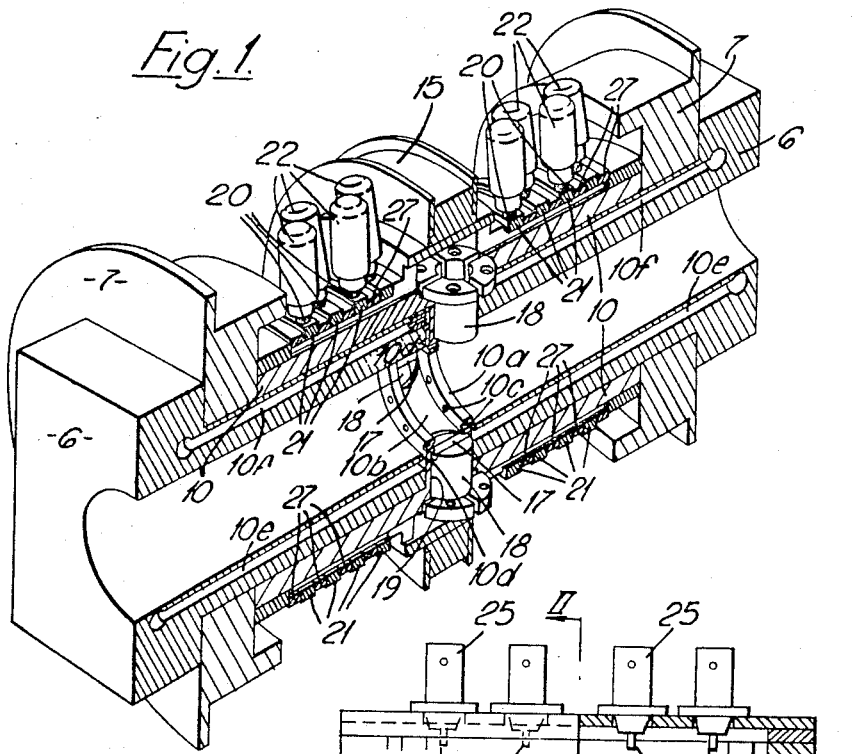
FIG. 1 is a schematic isometric sectional view of an ultrasonic probe head.
Figure 3:
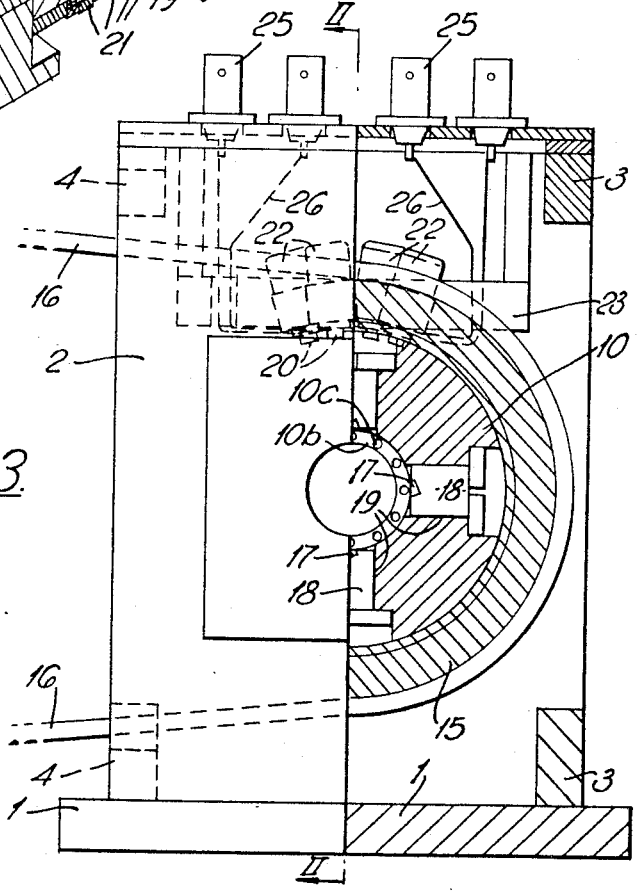
FIG. 3 is a half section of the line III—III in FIG. 2.
Figure 2:
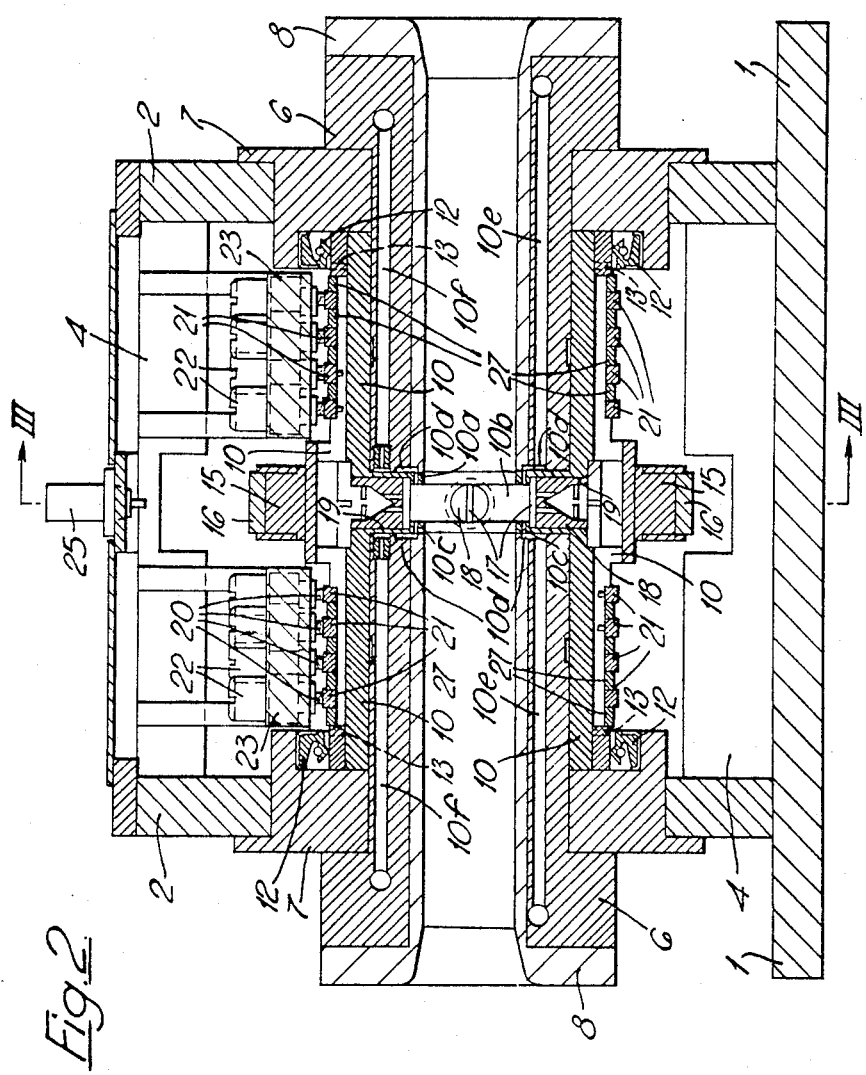
FIG. 2 is a side view of the probe head of FIG. 1, shown in section on the line II—II of FIG. 3.

A base plate 1 carries two end plates 2 spaced apart by two pairs of spacer bars 3, 4. A tubular stator member 6 of leaded bronze fits into a brass boss 7 in each end plate and a hard surfaced inner sleeve 8 of stainless steel fits into each stator member. The sleeves 8 are aligned to provide a guideway for a steel tube to be tested and the internal diameter of the sleeves is such that only a small clearance exists between the sleeves and the steel tube. A rotor 10 of Delrin fits round the outside of the stator members 6. The adjacent ends of the stator members 6 are axially spaced for a small distance and into this space an annular rib 10a on the rotor projects radially inwards, this rib being provided with a shallow annular recess 10b opening towards the axis of rotation. The annular rib 10a is provided with passages in the form of holes 10c leading to the recess 10b and registering with annular grooves 10d in the ends of the stator members 6, which grooves 10d are connected to axial passages 10e in the stator members. Thus, the annular recess 10b can be supplied with water through the axial passages 10e, the annular grooves 10d and the holes 10c. Further axial bores 10f in the stator members 6 feed water between the surfaces of the rotor 10 and the stator members 6 to lubricate the bearing surfaces. Seals 12 engage between the bosses 7 and seal support rings 13 on the rotor 10 to prevent or minimize leakage of the bearing water. A pulley 15 is mounted on the rotor 10 so that the latter can be driven round by a belt 16. Ultrasonic generators in the form of fixed angle piezoelectric crystals 17 mounted in removable holders 18 are spaced around the annular recess 10b, the crystals 17 being arranged so as to be very close to the surface of the tube being tested (preferably less than 3/16 inch from that surface). The holders 18 are disposed in radial bores 19 in the rotor 10. Electrical connections to the crystals 17 are made through brass slip rings 21 carried on the rotor 10 and engaged by brushes in holders 22 mounted on a support 23, the brushes 20 being connected to connector sockets 25 by conductor wires 26. The slip rings 21 are spaced apart by space rings 27 of Delrin or other electrically insulating material.

In use, a steel tube to be tested is passed through the guideway formed by the sleeves 8. Water is supplied as described above to the annular recess 10b and floods out to fill the gap between the tube and the sleeves 8 and thereby produce a liquid bearing. As the tube passes through the guideway, the rotor 10 is rapidly rotated and the desired tests are made.

The use of a water bearing between the stator members 6 and the rotor 10 minimizes acoustic noise while the use of a narrow, shallow recess 10b in the rotor 10 to retain an annulus of water permits of rotational speeds of 5,000 r.p.m. with good ultrasonic signals. (With arrangements having simple free water jets playing onto the tube surface, speeds of rotation are limited to about 1,000 r.p.m. because of break-up of the jets due to centrifugal force.) The water path between crystal and tube is sufficiently short that a pulse repetition frequency of 50 thousand pulses per second is possible. Three reflected pulses can be obtained from each defect and defects as short as 60/1000 inch can be detected. A very good signal to noise ratio is obtainable. The arrangement is particularly useful with tubes of small external diameter (e.g., 1 inch).

The crystals are readily interchangeable as a result of the use of removable holders. In the arrangement illustrated, provision has been made for four crystals. It is possible to use two crystals for the detection of longitudinal flaws by means of shear waves propagated in opposite directions. One or two crystals can be used for propagation of shear waves in such a manner that transverse flaws can be detected. It is also possible to use one crystal for continuous thickness monitoring.

The sleeves can be changed to accommodate a limited range of tube diameters, it being always necessary that only a small clearance exists between the tube and the sleeves.

I claim:

1. A rotary ultrasonic testing apparatus, comprising: a rotor having an annular rib which projects radially inward, said rib having an annular recess and a passageway formed therein with the passageway opening into the recess; a pair of mutually aligned tubular guide members extending in opposite directions from said annular rib and co-axial with said rotor, said tubular guide members defining a passage for movement of a test piece through said rotor; an ultrasonic generator mounted on said rotor and disposed in said annular recess; and means forming a coupling liquid supply duct communicating with said passageway for supplying liquid through said annular recess into said test piece passage, whereby said coupling liquid flows from said annular recess outwardly between said tubular guide members and said test piece.

2. A rotary ultrasonic testing apparatus as set forth in claim 1, wherein said means forming a coupling liquid supply duct comprises stator means stationarily supporting said tubular guide members; and wherein said rotor is mounted on said stator means for rotation thereabout.

3. A rotary ultrasonic testing apparatus as set forth in claim 2, wherein said stator means defines a lubricating liquid supply duct for supplying liquid between adjacent surfaces of said stator means and said rotor to lubricate said surfaces.

4. A rotary ultrasonic testing apparatus as set forth in claim 1, wherein said passageway is defined by a plurality of openings formed in and distributed around said annular rib on each side of said annular recess.

5. A rotary ultrasonic testing apparatus as set forth in claim 1, wherein said means forming a coupling liquid supply duct comprises a pair of stator members respectively receiving said tubular guide members; each of said stator members having an annular groove formed therein communicating with said coupling liquid supply duct; wherein said passageway is defined by a plurality of openings formed in and distributed around said annular rib on each side of said annular recess, said openings communicating with said annular recess and said annular groove and wherein said rotor is mounted for rotation about said stator members.

6. A rotary ultrasonic testing apparatus comprising: a rotor having an annular rib which projects radially inward, said rib having an annular recess and a plurality of openings formed therein, the openings being distributed around said rib in opposite sides thereof and opening into the recess; stator means supporting said rotor, said stator means comprising a pair of axially aligned and spaced tubular stator members on opposite sides of said recess, said rotor being rotatable about said tubular stator members; means defining an axial passage through said tubular stator members for movement of a test piece through said stator means; ultrasonic generator means mounted on said rotor and disposed in said annular recess for rotation about said test piece passage; said stator means having coupling liquid supply ducts, lubricating liquid supply ducts and annular grooves formed therein, said annular grooves communicating with said coupling liquid supply ducts and said openings, whereby coupling liquid supplied through said coupling liquid supply ducts is discharged from said openings through said annular recess to said test piece passage and said lubricating liquid supply ducts discharge lubricating liquid between said stator members and said rotor.

7. A rotary ultrasonic testing apparatus as set forth in claim 6, wherein a pair of guide sleeves, respectively inserted into said tubular stator members, define said axial passage.

References Cited

UNITED STATES PATENTS 3,415,111  12/1968  Chattaway et al. _____ 73—67.8

CHARLES A. RUEHL, Primary Examiner